US009035628B2

(12) United States Patent
Chan et al.

(10) Patent No.: US 9,035,628 B2
(45) Date of Patent: May 19, 2015

(54) MULTI-CHANNEL POWER SUPPLY AND CURRENT BALANCING CONTROL METHOD THEREOF

(75) Inventors: Cheng-Pang Chan, Kaohsiung (TW); Chen-Chih Huang, Jhudong Township, Hsinchu County (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 266 days.

(21) Appl. No.: 13/471,692

(22) Filed: May 15, 2012

(65) Prior Publication Data

US 2012/0293155 A1 Nov. 22, 2012

(30) Foreign Application Priority Data

May 16, 2011 (TW) ............................ 100117111 A

(51) Int. Cl.

| | |
|---|---|
| ***G05F 1/00*** | (2006.01) |
| ***H02M 3/158*** | (2006.01) |
| ***H02J 1/10*** | (2006.01) |

(52) U.S. Cl.

CPC ............. *H02M 3/1584* (2013.01); *H02J 1/102* (2013.01)

(58) Field of Classification Search

USPC ......................................... 323/272, 282, 285

See application file for complete search history.

(56) References Cited

U.S. PATENT DOCUMENTS

| | | | | |
|---|---|---|---|---|
| 4,947,171 | A * | 8/1990 | Pfeifer et al. | 341/143 |
| 6,670,794 | B1 | 12/2003 | Wang et al. | |
| 6,839,252 | B2 | 1/2005 | Tai et al. | |
| 8,030,908 | B2 | 10/2011 | Huang | |
| 8,030,911 | B2 * | 10/2011 | Nien et al. | 323/283 |
| 8,063,617 | B2 * | 11/2011 | Wang et al. | 323/272 |
| 8,072,200 | B1 * | 12/2011 | Qiu et al. | 323/282 |
| 2003/0218893 | A1 | 11/2003 | Tai et al. | |
| 2004/0008011 | A1 * | 1/2004 | Wang et al. | 323/213 |
| 2007/0024263 | A1 * | 2/2007 | Yang | 323/315 |
| 2008/0203985 | A1 * | 8/2008 | Dong et al. | 323/272 |

(Continued)

FOREIGN PATENT DOCUMENTS

| | | |
|---|---|---|
| TW | 538586 | 6/2003 |
| TW | 538586 B | 6/2003 |
| TW | 200926565 A | 6/2009 |

OTHER PUBLICATIONS

TW Office Action dated Oct. 25, 2013.

(Continued)

*Primary Examiner* — Jue Zhang
*Assistant Examiner* — Lakaisha Jackson
(74) *Attorney, Agent, or Firm* — McClure, Qualey & Rodack, LLP

(57) ABSTRACT

The multi-channel power supply comprises a first channel, a second channel, a current sensing module, a current average control circuit, and a modulator. The first channel and the second channel respectively transform an input voltage into an output voltage according to a first pulse width modulation (PWM) signal and a second PWM signal. The current sensing module respectively sense a first channel current and a second channel current to output a first sensing current and a second sensing current. The current average control circuit generates a first error current and a second error current according to the first sensing current and the second sensing current and an average current thereof. The modulator generates the first PWM signal and the second PWM signal according to the first error current, the second error current and the output voltage.

18 Claims, 7 Drawing Sheets

110 R11 L1 $V_{out}$ $I_{in}$ $I_{in1}$ $V_{in}$ M1 R12 M2 $C_f$ $R_L$ 130 132 142 140 first current sensing circuit $I_{sense1}$ current average circuit $I_{avg}$ second current sensing circuit $I_{sense2}$ error current generation circuit Id1 Id2 PWM1 modulator PWM2 150 134 144 120 $I_{in2}$ L2 R21 M3 R22 M4

(56) References Cited

U.S. PATENT DOCUMENTS

2009/0153110 A1 6/2009 Huang
2011/0175585 A1* 7/2011 Huang et al. .................. 323/282
2011/0316503 A1 12/2011 Huang

OTHER PUBLICATIONS

CN Office Action dated Mar. 24, 2014.

* cited by examiner

142

144a

MULTI-CHANNEL POWER SUPPLY AND CURRENT BALANCING CONTROL METHOD THEREOF

This application claims the benefit of Taiwan application Serial No. 100117111, filed May 16, 2011, the subject matter of which is incorporated herein by reference.

BACKGROUND OF THE INVENTION

1. Field of the Invention

The invention relates in general to a power supply, and more particularly to a multi-channel power supply and a current balancing control method thereof.

2. Description of the Related Art

The normal operation of an electronic device relies on power supply. No matter an electronic device is as big as a medical apparatus or communication network system or as small as a computer central processing unit (CPU), the electronic device all needs a stable power supply. However, conventional single power supply is unable to satisfy such a need. Along with the advance and progressing in the semiconductor technology, the working voltage of a computer central processing unit is getting lower and lower, and the operating speed is getting faster and faster. To support high efficiency operation, the computer central processing unit needs a larger volume of current. Due to the restriction in the dynamic characteristics of external elements (such as slew rate), conventional uni-channel power supply is unable to provide a sufficient volume of current to the computer central processing unit within a unit time. Therefore, multi-channel power supply starts to be used for providing power to the computer central processing unit, not only providing a more stable current output, but also outputting a smaller ripple voltage.

The multi-channel power supply, also referred as interleaved-phase switch power supply, equivalently uses multiple uni-channel power supplies to provide power to the loading in a parallel manner. The largest challenge for the parallel interleaved-phase is to assure that the loading current is uniformly distributed to each power supply. To assure that the loading current is uniformly distributed to each power supply, the conventional multi-channel power supply must use a comparator. By doing so, the conventional multi-channel power supply is likely affected by the bias voltage of the comparator and is also subjected to the restriction in the bandwidth of the comparator.

SUMMARY OF THE INVENTION

The invention is directed to a multi-channel power supply and a current balancing control method thereof.

According to one embodiment of the present invention, a multi-channel power supply is provided. The multi-channel power supply comprises a first channel, a second channel, a current sensing module, a current average control circuit, and a modulator. The first channel and the second channel respectively transform an input voltage into an output voltage according to a first pulse width modulation (PWM) signal and a second PWM signal. The current sensing module senses the first channel current flowing through the first channel to output a first sensing current, and senses the second channel current flowing through the second channel to output a second sensing current. And the current average control circuit generates an average current of the first sensing current and the second sensing current. The current average control circuit generates a first error current according to the difference between the first sensing current and average current. And generates a second error current according to the second sensing current and the average current. The modulator generates the first PWM signal according to the first error current and the output voltage, and generates the second PWM signal according to the second error current and the output voltage.

According to an alternate embodiment of the present invention, a current balancing control method of multi-channel power supply is provided. The multi-channel power supply at least comprises a first channel and a second channel. The current balancing control method comprises the following steps. The first channel current flowing through the first channel is sensed to output a first sensing current, and the second channel current flowing through the second channel is sensed to output the second sensing current. An average current of the first sensing current and the second sensing current are generated. A first error current is generated according to the first sensing current and the average current, and a second error current is generated according to the second sensing current and the average current. A first PWM signal is generated according to the first error current and the output voltage, and a second PWM signal is generated according to the second error current and the output voltage. An input voltage is transformed into an output voltage according to the first PWM signal and the second PWM signal respectively.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
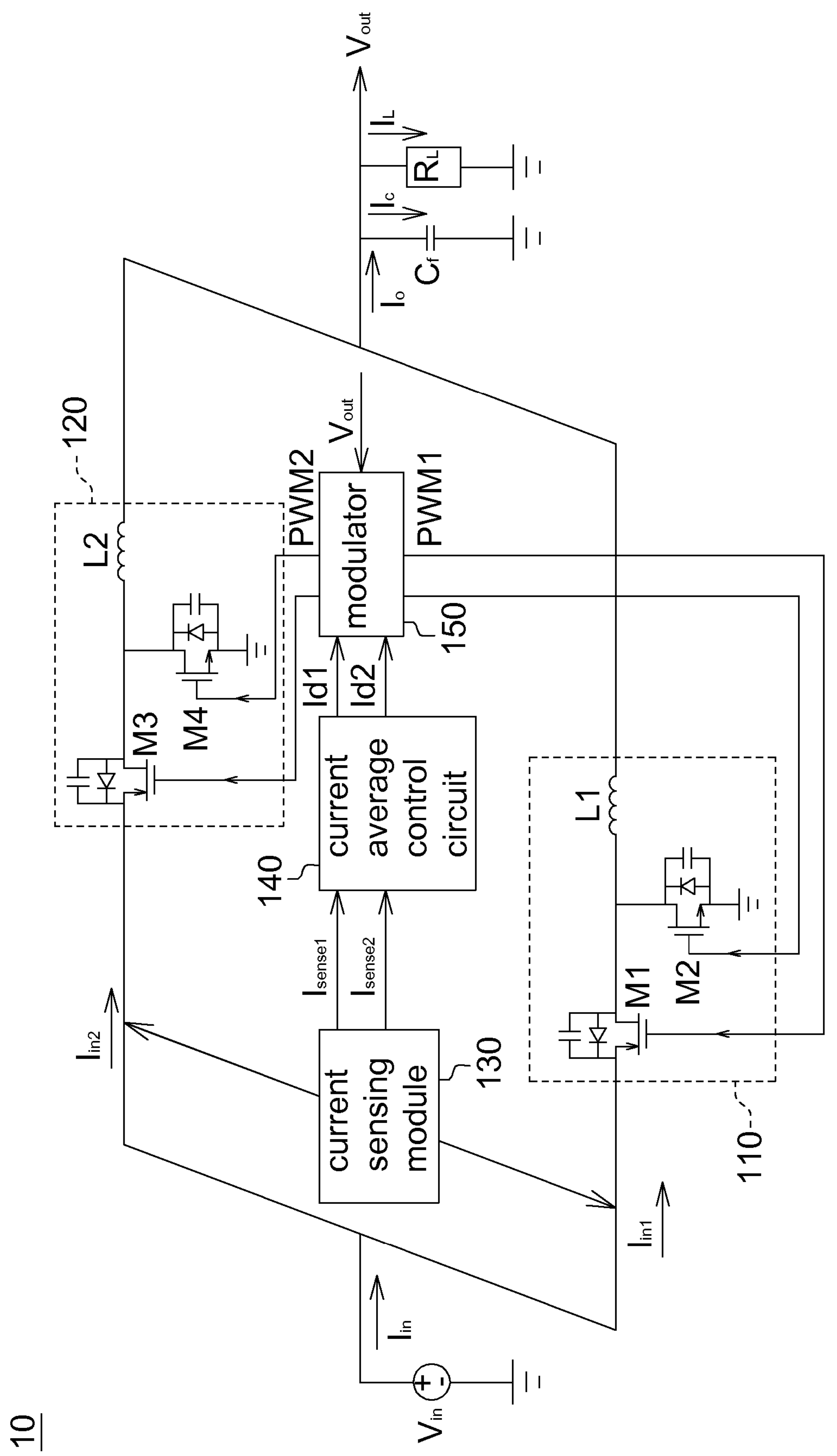
FIG. 1 shows a schematic diagram of a multi-channel power supply according to one embodiment of the invention.
Figure 2:
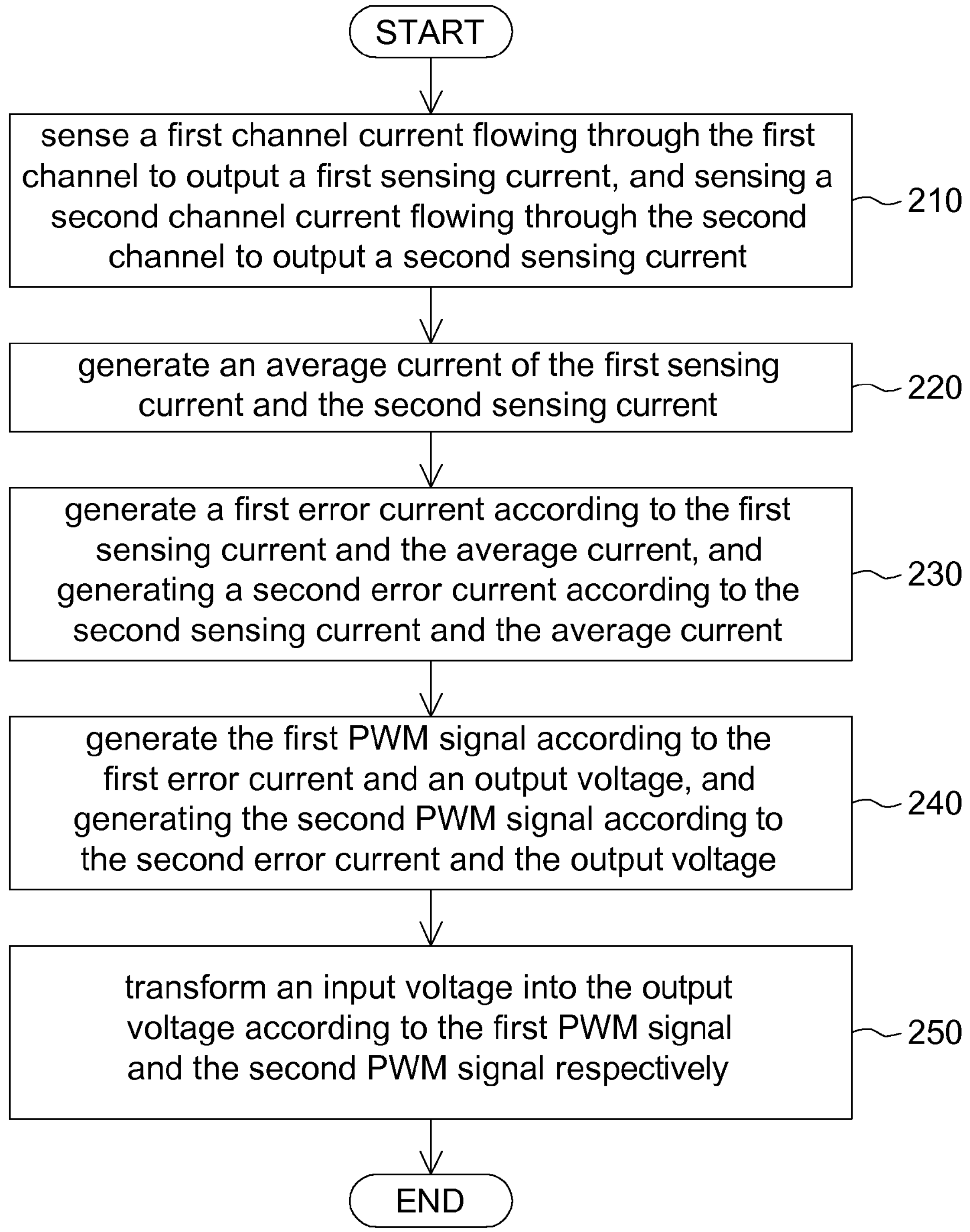
FIG. 2 shows a flowchart of a current balancing control method of multi-channel power supply according to one embodiment of the invention.

Referring to FIG. 1 and FIG. 2. FIG. 1 shows a schematic diagram of a multi-channel power supply according to one embodiment of the invention. FIG. 2 shows a flowchart of a current balancing control method of multi-channel power supply according to one embodiment of the invention. For convenience of elaboration, two channels are used as an exemplification in the following embodiments. However, the invention is not limited to such exemplification, and the following disclosure is also applicable to the multi-channel power supply having more than two channels. The multi-channel power supply 10 comprises a first channel 110, a second channel 120, a current sensing module 130, a current average control circuit 140 and a modulator 150. The current balancing control method applicable to the multi-channel power supply 10 at least comprises the following steps.

Firstly, as indicated in step 210, the current sensing module 130 senses a first channel current Iin1 flowing through the first channel 110 to output a first sensing current Isense1, and senses a second channel current Iin2 flowing through the second channel 120 to output a second sensing current Isense2. Next, as indicated in step 220, the current average control circuit 140 generates an average current Iavg of the sensing current Isense1 and the sensing current Isense2. Then, as indicated in step 230, the current average control circuit 140 generates an error current Id1 according to the sensing current Isense1 and the average current Iavg, and generates an error current Id2 according to the sensing current Isense2 and the average current Iavg. Then, as indicated in step 240, the modulator 150 generates a pulse width modulation (PWM) signal PWM1 according to the error current Id1 and an output voltage Vout, and generates a PWM signal PWM2 according to the error current Id2 and the output voltage Vout. Lastly, as indicated in step 250, the first channel 110 and the second channel 120 transform the input voltage Vin into the output voltage Vout according to the PWM signal PWM1 and the PWM signal PWM2 respectively.

Figure 3:
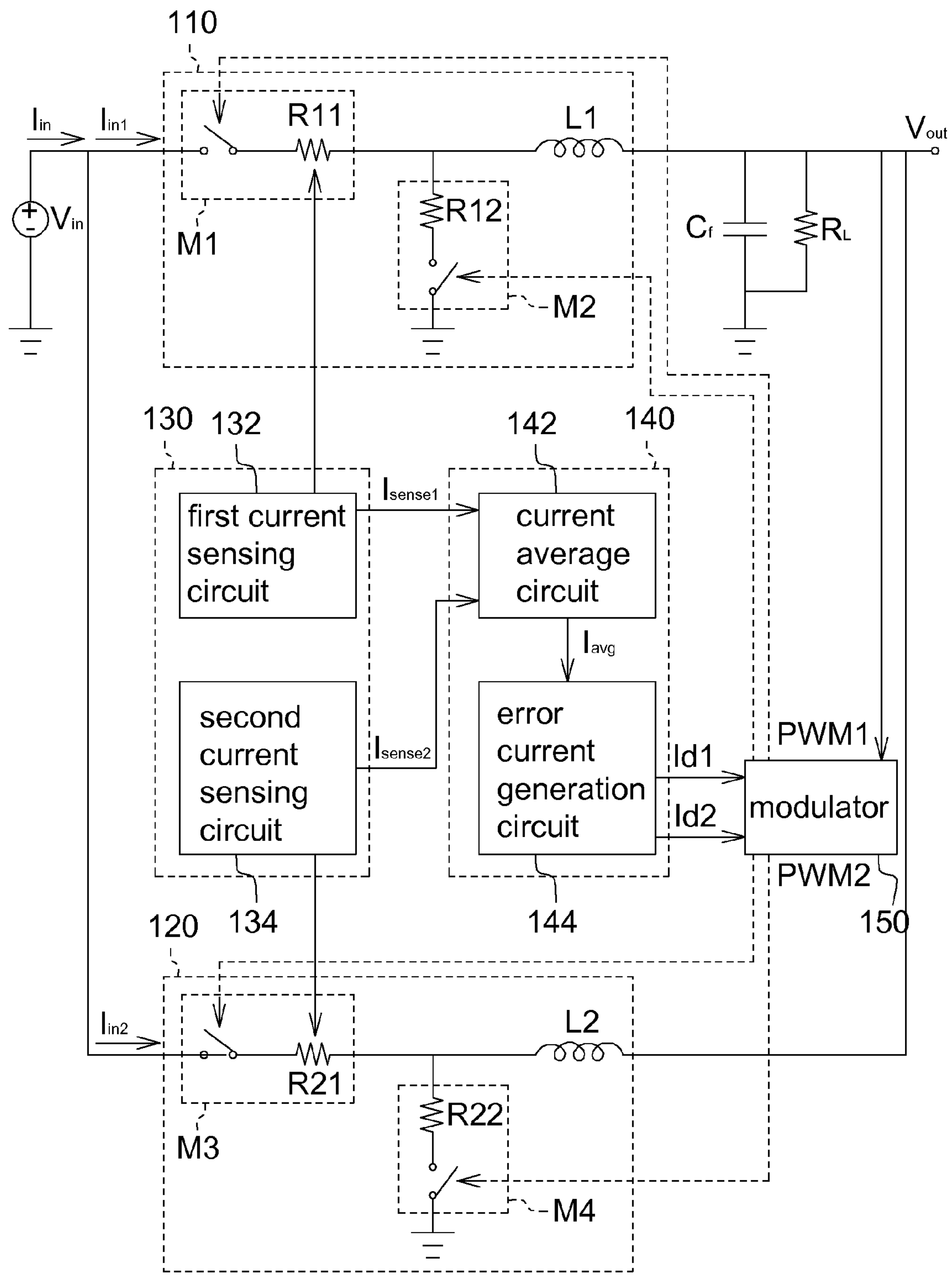
FIG. 3 shows details of FIG. 2.
Figure 4:
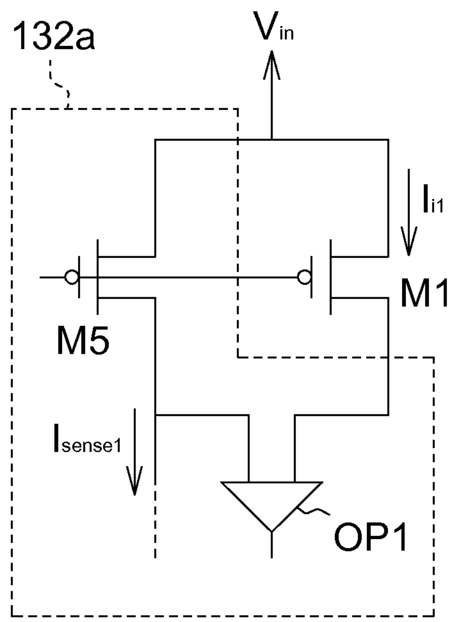
FIG. 4 shows a first schematic diagram of a first current sensing circuit.
Figure 5:
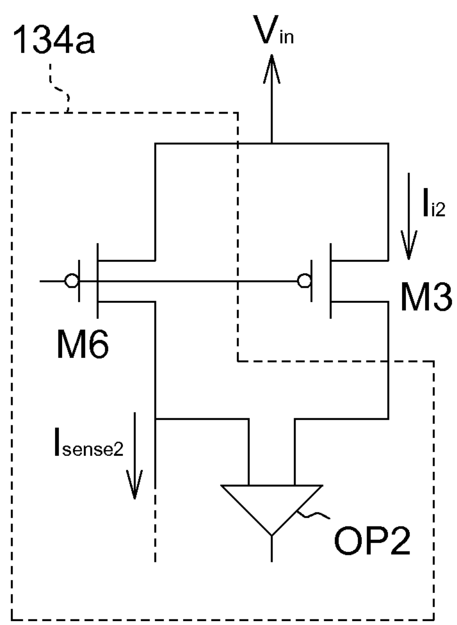
FIG. 5 shows a first schematic diagram of a second current sensing circuit.

Referring to FIG. 3, FIG. 4 and FIG. 5. FIG. 3 shows details of FIG. 2. FIG. 4 shows a first schematic diagram of a first current sensing circuit. FIG. 5 shows a first schematic diagram of a second current sensing circuit. The first channel 210 comprises a first inductor L1, the first transistor M1 and the second transistor M2, and the second channel 220 comprises a second inductor L2, a third transistor M3 and a fourth transistor M4. The channel resistor R11, the channel resistor R12, the channel resistor R21 and the channel resistor R22 respectively denote the channel resistors after the first transistor M1, the second transistor M2, the third transistor M3 and the fourth transistor M4 are turned on. The first transistor M1 and the third transistor M3 respectively receive the input voltage Vin. The second transistor M2 and the fourth transistor M4 are respectively coupled to the first transistor M1 and the third transistor M3. The first inductor L1 is coupled to the first transistor M1 and the second transistor M2. The second inductor L2 is coupled to the third transistor M3 and the fourth transistor M4.

The first transistor M1 and the second transistor M2 are controlled by the first PWM signal PWM1. The third transistor M3 and the fourth transistor M4 are controlled by the second PWM signal PWM2. Since the first PWM signal PWM1 and the second PWM signal PWM2 are phase-interleaved, the first transistor M1 and the third transistor M3 are alternately turned on. The first channel current lin1 flows through the first transistor M1 when the first transistor M1 is turned on. Likewise, the second channel current lin2 flows through the third transistor M3 when the third transistor M3 is turned on.

The current sensing module 130 further comprises a first current sensing circuit 132 and a second current sensing circuit 134. The first current sensing circuit 132 senses the first channel current Iin1 flowing through the first transistor M1 to output the first sensing current Isense1. The second current sensing circuit 134 senses the second channel current Iin2 flowing through the third transistor M3 to output the second sensing current Isense2.

The first current sensing circuit 132 and the second current sensing circuit 134 can be realized by different circuits. For example, the first current sensing circuit 132 and the second current sensing circuit 134 are respectively realized by the first current sensing circuit 132*a* of FIG. 4 and the second current sensing circuit 134*a* of FIG. 5. The first current sensing circuit 132*a* comprises a first operation amplifier OP1 and a fifth transistor M5. Since the first transistor M1 and the fifth transistor M5 are respectively coupled to an input end of the first operation amplifier OP1, the fifth transistor M5 mirrors the first sensing current Isense1. Through the dimension design of the first transistor M1 and the fifth transistor M5, the first sensing current Isense1 is equal to $$\frac{1}{N}$$

of the first channel current Iin1, wherein N is a positive integer.

Likewise, the second current sensing circuit 134*a* comprises a second operation amplifier OP2 and a sixth transistor M6. Since the third transistor M3 and the sixth transistor M6 are respectively coupled to an input end of the second operation amplifier OP2, the sixth transistor M6 mirrors the second sensing current Isense2. Through the dimension design of the third transistor M3 and the sixth transistor M6, the second sensing current Isense2 is equal to $$\frac{1}{N}$$

of the second channel current Iin2, wherein N is a positive integer.

Figure 6:
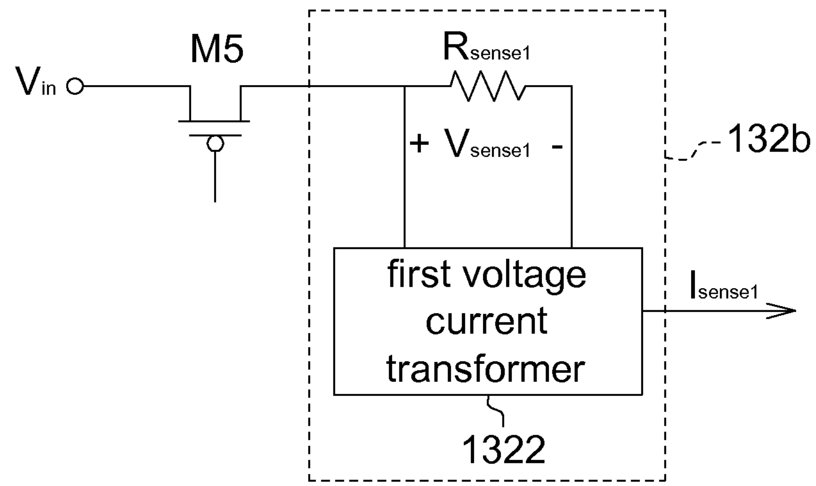
FIG. 6 shows a second schematic diagram of a first current sensing circuit.
Figure 7:
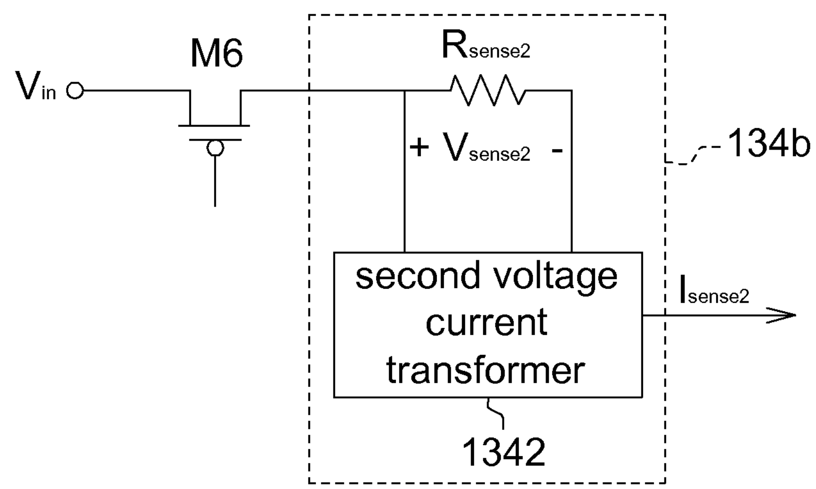
FIG. 7 shows a second schematic diagram of a second current sensing circuit.

Referring to FIG. 3, FIG. 6 and FIG. 7. FIG. 6 shows a second schematic diagram of a first current sensing circuit. FIG. 7 shows a second schematic diagram of a second current sensing circuit. The first current sensing circuit 132 and the second current sensing circuit 134 can respectively be realized by the first current sensing circuit 132*a* of FIG. 4 and the second current sensing circuit 134*a* of FIG. 5 in addition to the first current sensing circuit 132*b* of FIG. 6 and the second current sensing circuit 134*b* of FIG. 7.

The first current sensing circuit 132*b* comprises a first sensing resistor Rsense1 and a first voltage current transformer 1322. The first sensing resistor Rsense1 is coupled to the fifth transistor M5. The first channel current lin1 flows through the first sensing resistor Rsense1 to form a first sensing voltage Vsense1. The first voltage current transformer 1322 transforms the first sensing voltage Vsense1 into the first sensing current Isense1.

Likewise, the second current sensing circuit 134*b* comprises a second sensing resistor Rsense2 and a second voltage current transformer 1342. The second sensing resistor Rsense2 is coupled to the sixth transistor M6. The second channel current Iin2 flows through the second sensing resistor Rsense2 to form a second sensing voltage Vsense2. The second voltage current transformer 1342 transforms the second sensing voltage Vsense2 into the second sensing current Isense2.

Figure 8:
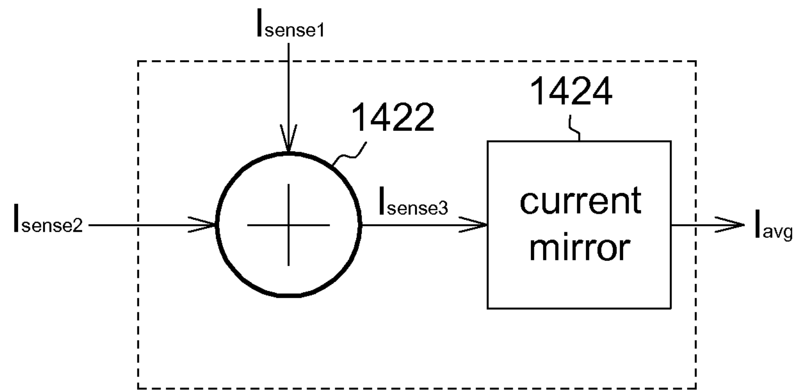
FIG. 8 shows a schematic diagram of a current average circuit.
Figure 9:
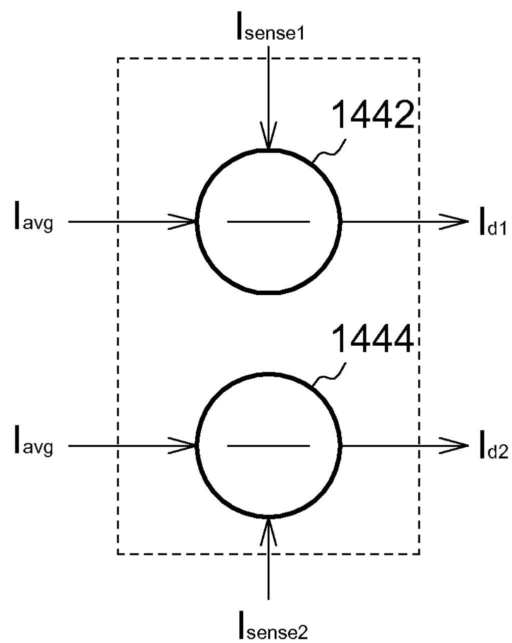
FIG. 9 shows a schematic diagram of a first error current generation circuit.
Figure 10:
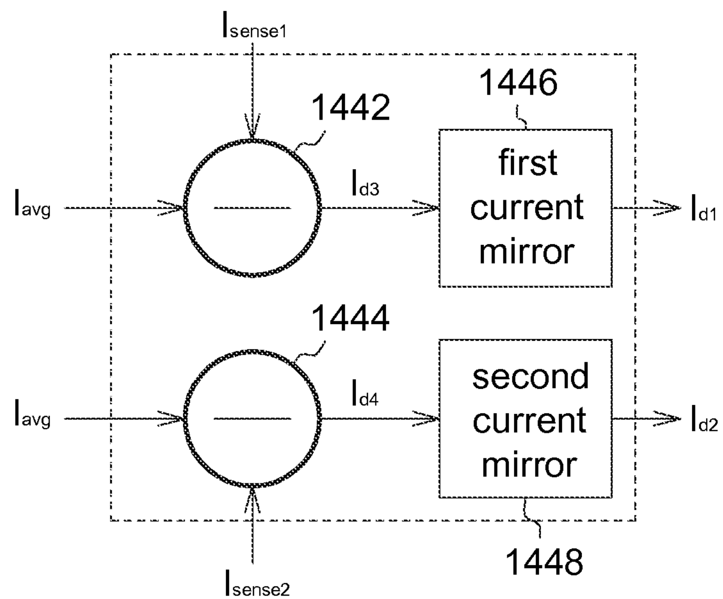
FIG. 10 shows a schematic diagram of a second error current generation circuit.

Referring to FIG. 3, FIG. 8, FIG. 9 and FIG. 10. FIG. 8 shows a schematic diagram of a current average circuit. FIG. 9 shows a schematic diagram of a first error current generation circuit. FIG. 10 shows a schematic diagram of a second error current generation circuit. The current average control circuit 140 further comprises a current average circuit 142 and an error current generation circuit 144. The current average circuit 142 comprises an adder 1422 and a current mirror 1424. The adder 1422 adds the first sensing current Isense1 and the second sensing current Isense2 to output a total sensing current Isense3. The current mirror 1424 mirrors a half of the total sensing current Isense3 into the average current Iavg. Since the present embodiment of the invention is exemplified by two channels, the average current Iavg mirrored by the current mirror 1424, that is, the total sensing current Isense3, is divided by 2. When applied in a multi-channel power supply with more than two channels, the average current Iavg mirrored by the current mirror 1424, that is, the total sensing current Isense3, is divided by the number of channels.

The error current generation circuit 144 can be realized by the error current generation circuit 144*a* of FIG. 9 or the error current generation circuit 144*b* of FIG. 10. The error current generation circuit 144*a* comprises a first subtractor 1442 and a second subtractor 1444. The first subtractor 1442 subtracts the first sensing current Isense1 by the average current Iavg to generate the first error current Id1. The second subtractor 1444 subtracts the second sensing current Isense2 by the average current Iavg to generate the second error current Id2.

The error current generation circuit 144*b* comprises a first subtractor 1442*a* the second subtractor 1444, a first current mirror 1446 and a second current mirror 1448. The first subtractor 1442 subtracts the first sensing current Isense1 by the average current Iavg to generate the first current variation Id3. The second subtractor 1444 subtracts the second sensing current Isense2 by the average current Iavg to generate the second current variation Id4. The first current mirror 1446 mirrors the first error current Id1 proportional to the first current variation Id3. The second current mirror 1448 mirrors the second error current Id2 proportional to the second current variation Id4.

Through the dimension design of the transistor of the first current mirror 1446, the first error current Id1 is equal to $$\frac{1}{\beta}$$

of the first current variation Id3, wherein $\beta$ is a positive integer. Likewise, through the dimension design of the transistor of t the second current mirror 1448, the second error current Id2 is equal to $$\frac{1}{\beta}$$

of the second current variation Id4.

Figure 11:
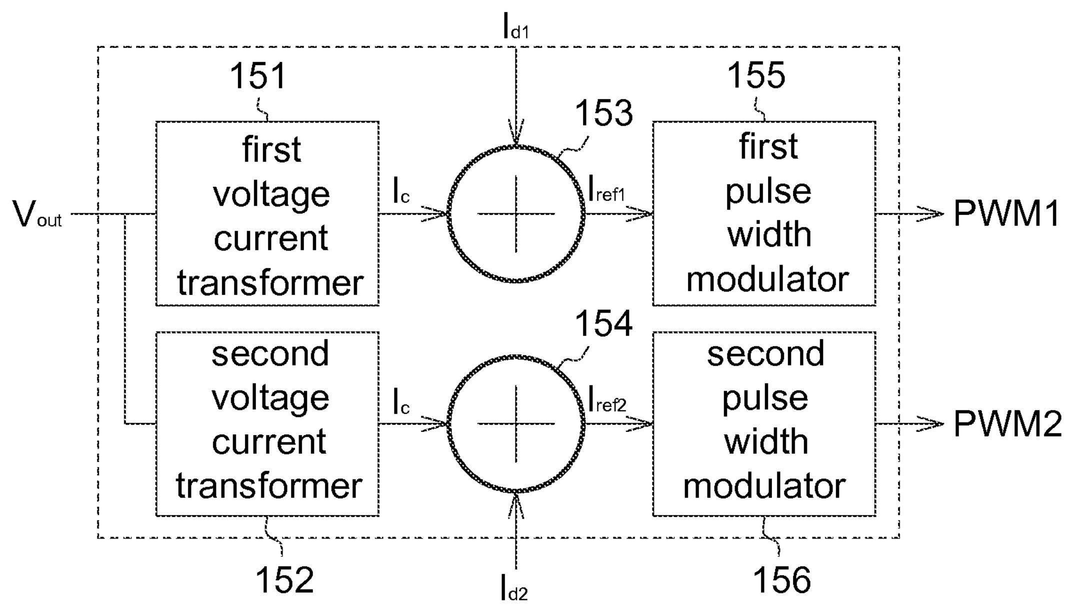
FIG. 11 shows details of the modulator.

Referring to FIG. 11, details of the modulator are shown. The modulator 150 further comprises a first voltage current transformer 151, a second voltage current transformer 152, a first adder 153, a second adder 154, a first pulse width modulator 155 and a second pulse width modulator 156. The first voltage current transformer 151 and the second voltage current transformer 152 transform the output voltage Vout into a relevant current Ic. The first adder 153 adds relevant current Ic and the first error current Id1 to output a first reference current Iref1. The second adder 154 adds the relevant current Ic and the second error current Id2 to output a second reference current Iref2. The first pulse width modulator 155 and the second pulse width modulator 156 respectively are such as a current-mode pulse width modulator. The first pulse width modulator 155 outputs the first PWM signal PWM1 according to the first reference current Iref1. The second pulse width modulator 156 outputs the second PWM signal PWM2 according to the second reference current Iref2.

Despite the above embodiments are exemplified by two channels, the invention is not limited to such exemplification, and the above disclosure is also applicable to the multi-channel power supply with more than two channels. The multi-channel power supply and the current balancing control method thereof disclosed in the above embodiments of the invention do not use the comparator, and is thus not affected by the biased voltage of the comparator. Being not subjected to the restriction in the bandwidth of the comparator, the multi-channel power supply and the current balancing control method thereof the invention are applicable to high-speed switch, and can achieve faster transition response.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multi-channel power supply, comprising:

a first channel and a second channel respectively used for transforming an input voltage into an output voltage according to a first pulse width modulation (PWM) signal and a second PWM signal;

a current sensing module used for sensing a first channel current flowing through the first channel to output a first sensing current and for sensing a second channel current flowing through the second channel to output a second sensing current;

a current average control circuit used for generating a first error current according to the first sensing current and an average current of the first sensing current and the second sensing current and for generating a second error current according to the second sensing current and the average current; and a modulator used for transforming the output voltage into a relevant current, for generating the first PWM signal according to the first error current and the relevant current and for generating the second PWM signal according to the second error current and the relevant current;

wherein the current average control circuit comprises:

an adder used for adding the first sensing current and the second sensing current to output a total sensing current; and a current mirror used for mirroring a half of the total sensing current into the average current.

2. The multi-channel power supply according to claim 1, wherein the current average control circuit comprises:

a current average circuit used for generating the average current of the first sensing current and the second sensing current; and an error current generation circuit used for generating the first error current according to the first sensing current and the average current and for generating the second error current according to the second sensing current and the average current.

3. The multi-channel power supply according to claim 1, wherein the current average control circuit comprises:

a first subtractor used for subtracting the first sensing current by the average current to generate the first error current; and a second subtractor used for subtracting the second sensing current by the average current to generate the second error current.

4. The multi-channel power supply according to claim 1, wherein the current average control circuit comprises:

a first subtractor used for subtracting the first sensing current by the average current to generate a first current variation;

a second subtractor used for subtracting the second sensing current by the average current to generate a second current variation;

a first current mirror used for mirroring the first error current proportional to the first current variation; and a second current mirror used for mirroring the second error current proportional to the second current variation.

5. The multi-channel power supply according to claim 1, wherein the modulator comprises:

a first voltage current transformer used for transforming the output voltage into the relevant current;

a second voltage current transformer used for transforming the output voltage into the relevant current;

a first adder used for adding the relevant current and the first error current to output a first reference current;

a second adder used for adding the relevant current and the second error current to output a second reference current;

a first pulse width modulator used for outputting the first PWM signal according to the first reference current; and a second pulse width modulator used for outputting the second PWM signal according to the second reference current.

6. The multi-channel power supply according to claim 1, wherein the first channel comprises a first transistor and a second transistor, the second channel comprises a third transistor and a fourth transistor, the first transistor and the third transistor respectively receive the input voltage, the second transistor and the fourth transistor are respectively coupled to the first transistor and the third transistor, the first transistor and the second transistor are controlled by the first PWM signal, and the third transistor and the fourth transistor are controlled by the second PWM signal.

7. The multi-channel power supply according to claim 6, wherein the current sensing module comprises:

a first current sensing circuit used for sensing the first channel current flowing through the first transistor; and a second current sensing circuit used for sensing the second channel current flowing through the third transistor.

8. The multi-channel power supply according to claim 7, wherein the first current sensing circuit comprises:

a first operation amplifier coupled to the first transistor; and a fifth transistor, wherein the first transistor and the fifth transistor are respectively coupled to the first operation amplifier, such that the fifth transistor mirrors the first sensing current.

9. The multi-channel power supply according to claim 8, wherein the first sensing current is $$\frac{1}{N}$$

of the first channel current with N being a positive integer.

10. The multi-channel power supply according to claim 8, wherein the second current sensing circuit comprises:

a second operation amplifier coupled to the third transistor; and a sixth transistor, wherein the third transistor and the sixth transistor are respectively coupled to the second operation amplifier, such that the sixth transistor mirrors the second sensing current.

11. The multi-channel power supply according to claim 10, wherein the second sensing current is $$\frac{1}{N}$$

of the second channel current with N being a positive integer.

12. The multi-channel power supply according to claim 10, wherein the first current sensing circuit comprises:

a first sensing resistor coupled to the fifth transistor, wherein the $$\frac{1}{N}$$

times first channel current flows through the first sensing resistor to form a first sensing voltage; and a first voltage current transformer used for transforming the first sensing voltage into the first sensing current.

13. The multi-channel power supply according to claim 12, wherein the second current sensing circuit comprises:

a second sensing resistor coupled to the sixth transistor, wherein the $$\frac{1}{N}$$

times second channel current flows through the second sensing resistor to form a second sensing voltage; and a second voltage current transformer used for transforming the second sensing voltage into the second sensing current.

14. A current balancing control method of a multi-channel power supply, wherein the multi-channel power supply at least comprises a first channel and a second channel, and the current balancing control method comprises:

sensing a first channel current flowing through the first channel to output a first sensing current, and sensing a second channel current flowing through the second channel to output a second sensing current;

generating an average current of the first sensing current and the second sensing current;

generating a first error current according to the first sensing current and the average current, and generating a second error current according to the second sensing current and the average current;

transforming the output voltage into a relevant current;

generating the first PWM signal according to the first error current and the relevant current, and generating the second PWM signal according to the second error current and the relevant current; and transforming an input voltage into the output voltage according to the first PWM signal and the second PWM signal respectively;

wherein the step of generating the average current of the first sensing current and the second sensing current comprises:

adding the first sensing current and the second sensing current to output a total sensing current; and mirroring a half of the total sensing current into the average current.

15. The current balancing control method according to claim 14, wherein the step of generating the first PWM signal according to the first error current and the relevant current and generating the second PWM signal according to the second error current and the relevant current comprises:

transforming the output voltage into the relevant current;

adding the relevant current and the first error current to output a first reference current;

adding the relevant current and the second error current to output a second reference current;

outputting the first PWM signal according to the first reference current; and outputting the first PWM signal according to the second reference current.

16. The current balancing control method according to claim 14, wherein the first channel comprises a first transistor and a second transistor, the second channel comprises a third transistor and a fourth transistor, the first transistor and the third transistor respectively receive the input voltage, the second transistor and the fourth transistor are respectively coupled to the first transistor and the third transistor, the first transistor and the second transistor are controlled by the first PWM signal, and the third transistor and the fourth transistor are controlled by the second PWM signal.

17. The current balancing control method according to claim 14, wherein the step of generating the first PWM signal according to the first error current and the relevant current and generating the second PWM signal according to the second error current and the relevant current comprises:

subtracting the first sensing current by the average current to generate the first error current; and subtracting the second sensing current by the average current to generate the second error current.

18. The current balancing control method according to claim 14, wherein the step of generating the first PWM signal according to the first error current and the relevant current and generating the second PWM signal according to the second error current and the relevant current comprises:

subtracting the first sensing current by the average current to generate a first current variation;

subtracting the second sensing current by the average current to generate a second current variation;

mirroring the first error current proportional to the first current variation; and mirroring the second error current proportional to the second current variation.

* * * * *